United States Patent [19]

Aksay et al.

[11] Patent Number: 5,061,682
[45] Date of Patent: Oct. 29, 1991

[54] CERAMIC PRECURSOR MIXTURE AND TECHNIQUE FOR CONVERTING THE SAME TO CERAMIC

[75] Inventors: Ilhan A. Aksay, Bellevue; Chan Han, Lynnwood; Gary D. Maupin, Richland; Corrie B. Martin, Seattle; Randal P. Kurosky, Federal Way; Gregory C. Stangle, Seattle, all of Wash.

[73] Assignee: The Washington Technology Center, Seattle, Wash.

[21] Appl. No.: 465,738

[22] Filed: Jan. 17, 1990

[51] Int. Cl.$^5$ .................... C01B 13/14; C01D 1/00; C01F 1/00; C01G 1/00
[52] U.S. Cl. ........................... 505/1; 423/592; 423/594; 423/596; 423/600; 423/603; 423/604; 423/617; 423/618; 423/622; 423/624; 423/632; 423/634; 505/737; 501/123; 501/126; 501/127; 501/132; 152/152
[58] Field of Search .............. 423/592, 594, 596, 600, 423/603, 604, 617, 618, 622, 624, 632, 636; 505/1, 737

[56] References Cited

U.S. PATENT DOCUMENTS 3,385,915 5/1968 Hamling .............................. 264/0.5
4,065,544 12/1977 Hamling et al. ..................... 423/263

OTHER PUBLICATIONS

Reed, "Introduction to the Principle of Ceramic Processing", John Wiley & Sons, 1988, pp. 51-53.

Primary Examiner—William R. Dixon, Jr.
Assistant Examiner—M. Bonnek
Attorney, Agent, or Firm—Christensen, O'Connor, Johnson & Kindness

[57] ABSTRACT

Ceramic precursor mixtures containing a metal cation, a carbohydrate, and an anion capable of participating in an anionic oxidation-reduction reaction with the carbohydrate for continuous or batchwise drying and pyrolyzing to provide ceramic powders.

21 Claims, 5 Drawing Sheets

CERAMIC PRECURSOR MIXTURE AND TECHNIQUE FOR CONVERTING THE SAME TO CERAMIC

FIELD OF THE INVENTION

The present invention relates to ceramic powder materials and compositions and methods for preparing the same.

BACKGROUND OF THE INVENTION

The use of high temperature superconducting ceramic articles and nonsuperconducting ceramic articles requires reproducible production of the articles from ceramic powders with high densities, high purities, good homogeneity, and fine grain size. Processing of ceramic powders for production of such ceramic articles indicates that these characteristics can be achieved by starting with submicron ceramic powder composed of equiaxed or substantially symmetrical particles with a homogenous chemical composition and a narrow but not necessarily monodispersed size distribution.

A common method for producing superconducting ceramic powders involves grinding ceramic powders produced by solid state reactions. The grinding provides particles that are greater than one micron in size, are not equiaxed, have a broad particle size distribution, and are often contaminated by the grinding media. Techniques such as sol-gel, precipitation, and freeze-drying have been developed to overcome some of these undesirable features of ceramic particles produced by grinding; however, most of these alternative techniques for producing ceramic particles cannot directly produce superconductive ceramic particles. The sol-gel and precipitation methods rely upon gelation or precipitation, both of which are difficult phenomena to predict and control. For example, when mixed metal cation ceramics are to be produced, gelation or precipitation of the separate components or phases should occur somewhat simultaneously and at about the same rate so that the mixing of the different cations is homogenous. The segregation of the cations is particularly troublesome when the gelation or precipitation is carried out in a batch, such as a beaker, because the distance the cations can become segregated is large compared to the size of the final powders.

Another attempt at producing submicron superconducting ceramic powder as well as nonsuperconductive ceramic powder composed of equiaxed particles with homogenous chemical composition and a narrow size distribution involves passing a ceramic precursor solution through an aerosol generator to convert the solution into a plurality of fine droplets. The droplets are then carried through a furnace which supplies substantially all the thermal energy that causes the solvent in the solution to evaporate and the ceramic precursor materials to decompose to form ceramic particles. Because the furnaces typically operate at high temperatures on the order of 1000° C., the external energy requirements are high, which leads to high energy costs of operation.

It has been reported that nitrogen containing compounds such as urea and glycine can be used as a fuel to provide combustion on a batchwise scale for the conversion of pastes or solutions of metal nitrates and glycine or urea to ceramics. The glycine is reported to complex with the metal cations, allowing the solution to be thickened to a honey-like consistency before the solvent is evaporated. Upon evaporation of the solvent, a viscous foam is formed and eventually ignites. The urea/metal nitrate solution is reported to form a polymeric gel upon combustion. The polymeric gel is converted into a foam by the gases produced by the combustion. The production of intermediates with a honey-like consistency or a polymeric gel prior to or during combustion is dangerous because buildup of these less than completely reacted intermediates on process equipment can create the potential for an uncontrollable explosive reaction.

Although the techniques described above have shown some success in producing submicron superconductive and nonsuperconductive ceramic powders composed of equiaxed particles with homogenous chemical composition and/or narrow size distribution, such prior techniques have very high and costly external energy requirements. For economic reasons, in the increasingly competitive ceramic industry, it would be advantageous to produce ceramic powders having the characteristics described above by a process that requires less external energy than previously available processes.

SUMMARY OF THE INVENTION

The present invention is a ceramic precursor composition and a process utilizing this ceramic precursor composition for the production of superconductive and nonsuperconductive ceramic powders. The ceramic powders produced from the precursor composition and the process of the present invention exhibit physical and chemical characteristics that are desirable for the production of superconducting articles and nonsuperconducting articles from the ceramic particles.

Ceramic precursor mixtures formed in accordance with the present invention include a metal cation capable of being converted to a metal oxide by thermal energy, a carbohydrate, and an anion capable of participating in an anionic oxidation-reduction reaction with the carbohydrate.

A process carried out in accordance with the present invention involves forming droplets of the ceramic precursor mixture described above, removing substantially all of the solvent from the droplets to provide dried particles, and thermally initiating an anionic oxidation-reduction reaction between the anion and the carbohydrate. Although the process can be carried out on a batchwise or continuous basis, a continuous process is preferred from the standpoint of the economics of producing ceramic powders on a commercial basis.

BRIEF DESCRIPTION OF THE DRAWINGS

A better understanding of the present invention can be derived by reading the ensuing specification in conjunction with the accompanying drawing wherein.

DETAILED DESCRIPTION OF THE INVENTION

In accordance with the present invention, a carbohydrate, preferably a saccharide, is oxidized by an anion in a ceramic precursor mixture that includes a metal cation to provide thermal energy in the form of a chemical reaction that promotes and preferably completes the conversion of the metal cation to a ceramic. As one skilled in the art will appreciate, if more than one metal is to be included in the final ceramic, more than one metal cation will be in the ceramic precursor mixture. Although the following description of the present invention refers to a metal salt as providing the anion and the metal cation in the ceramic precursor mixture, as described below, the anion and the metal cation can be introduced into the ceramic precursor mixture as independent elements or compounds. The following description is given in the context of the preferred means of providing the anion and the metal cation, that is, from a metal salt. The phrase "metal salt" as used below is intended to describe each of the metal salts when there is more than one metal salt in the ceramic precursor mixture.

The carbohydrate participates in an exothermic anionic oxidation-reduction reaction with an anion of the metal salt. The exothermic reaction is the primary source of thermal energy used to convert the metal salt to a single phase or multiphase ceramic material. In the context of this description, the phrase "ceramic material" refers to metal hydroxides, metal carbonates and metal oxides. The balance of the thermal energy is provided by an external heat source such as a gas or electric furnace. Depending on the particular metal chemistry, the ceramic may or may not be superconductive. Since the anionic oxidation-reduction reaction provides a substantial portion of the thermal energy needed to complete the conversion of the metal salt to a single phase ceramic, less external energy (e.g., gas heat or electric heat) is needed to complete the conversion compared to the energy required when the carbohydrate is not used.

In the context of a process carried out in accordance with the present invention, small droplets are formed from the ceramic precursor mixture. The solvent is then removed from the droplets to provide substantially solid particles of the metal salt and the carbohydrate. The particles are then passed through a furnace preheated to a temperature sufficient to initiate the anionic oxidation-reduction reaction between the anion of the metal salt and the carbohydrate. Because of the thermal energy provided by the exothermic anionic oxidation-reduction reaction, the furnace is generally operated at a temperature below the temperature typically used to convert the metal salt to a single phase ceramic.

In addition to providing thermal energy for the conversion of the metal salt to a single phase ceramic in the furnace, gases formed during the anionic oxidation-reduction reaction hinder interparticle sintering and cause break down of the larger dried particles into smaller primary particles. It has been found that the use of the carbohydrate provides thermal energy to convert the metal salt to a single phase ceramic and reduces the dried particles to smaller primary particles without producing undesirable complexes, intermediates or reaction products that tend to deposit and remain on the processing equipment. The carbohydrates useful in the context of the present invention do not complex with the metal ions in the ceramic precursor mixture. In other words, the carbohydrates function as described above independently of the type of metal ions in the ceramic precursor mixture. When complexes are formed between some organics such as glycine or urea and the metal ions, it has been found that it becomes difficult to completely dry the droplets. In addition, some complexes cause the droplets to become highly viscous as they are dried or melt, which allows the droplets to deposit and build up on the process equipment or to form undesirable agglomerates.

The carbohydrates useful in the present invention are soluble in water or short chain alcohols, such as methanol or ethanol, that can be used as solvents in the present invention. Water is the preferred solvent because of its ready availability, the ease with which it can be purified, the ease with which it can be cleaned up, and the ease with which it is removed from the droplets without leaving behind unwanted materials. The carbohydrates, with saccharides being preferred, can enter into and complete an exothermic anionic oxidation-reduction reaction with the anion of the metal salt. The reaction is clean and produces gases that can be easily separated from the particles. Of the many carbohydrates useful in the present invention, the saccharides are preferred because they are readily available, inexpensive and decompose cleanly. Of the many different saccharides, mono- and disaccharides are preferred for use in the present invention. Suitable monosaccharides include fructose and glucose. Useful disaccharides include sucrose, lactose, and maltose, with sucrose being preferred because it is the most economical.

Any metal salts soluble in the solvents described above that are capable of being converted into metal oxides by heat to form ceramic materials can be used in accordance with the present invention. The metal salt preferably includes an anion that is an oxidizing agent for the carbohydrate used. The metal salt should exhibit oxidizing properties and a relatively low decomposition temperature so that the external thermal energy required to initiate the anionic oxidation-reduction reaction and convert the metal salt to a ceramic is minimized. The metal salt should be convertible to a single phase ceramic at a temperature that is generated in and around the dried particle in the furnace by the exothermic anionic oxidation-reduction reaction between the carbohydrate and the anion of the metal salt. Examples of such metal salts include metal nitrates, metal formates, and metal peroxides whose anions can act as oxidizing agents for the carbohydrate. It should be understood that this list of anions and the list below of metal cations is exemplary of the anionic and cationic components of metal salts that can be used to form a ceramic precursor mixture in accordance with the present invention.

The oxidizing anion can be introduced into the ceramic precursor mixture in a form other than a metal salt; however, if a cation is associated with the oxidizing anion and the cation is not to form part of the ceramic it must be capable of being removed from the precursor mixture or the dried particles. Preferably, the anion forms a metal salt with a metal cation that becomes a component of the ceramic. Examples of this type of metal cation includes aluminum, barium, bismuth, cal cium, copper, chromium, europium, iron, gadolinium, holmium, lanthanum, manganese, lead, strontium, ytterbium, yttrium, and zinc. As one familiar with ceramics will appreciate, these exemplary metal cations can be combined to provide ceramics of different stoichiometries. An exemplary list of nonsuperconductive ceramics that can be made from the ceramic precursor mixtures and the process of the present invention include:

$Y_2Ba_1Cu_1O_5$
$La_1Cr_1O_3$
$La_1Cr_{(1-x)}M_xO_3$ where M = various metal cations having a valence of 2+ such as Mg, Ca, Ba, Sr, Co, and Fe.
$La_1Al_1O_3$
Mn-Zn-Fe-oxide (various stoichiometries)
$BaO.6Fe_2O_3$
$SrO.6Fe_2O_3$
Al-Cr-oxide (various stoichiometries)
CuO
$Y_2O_3$ An exemplary list of superconductive ceramics that can be made from the ceramic precursor mixtures and process of the present invention include:

$Y_1Ba_2Cu_3O_7$
$Y_1Ba_2Cu_4O_8$
$Bi_2Sr_2Ca_2Cu_3O_{10}$
$Bi_2Sr_2Ca_1Cu_2O_8$
$Bi_{(2-x)}Pb_{(x)}Sr_2Ca_2Cu_3O_{10}$
$La_2Cu_1O_4$
$La_{(2-x)}Sr_{(x)}Cu_1O_4$
$Eu_1Ba_2Cu_3O_7$
$Yb_1Ba_2Cu_3O_7$
$Gd_1Ba_2Cu_3O_7$
$Ho_1Ba_2Cu_3O_7$

The particular method of forming the ceramic precursor mixture of solvent, metal salt or salts, and carbohydrate is not critical so long as an intimate mixture is provided. From a quality standpoint, particularly in a mixed metal salt precursor mixture, segregation of the various components is undesirable. The intimacy and completeness of the mixing of the metal salt or salts in the solvent is important because the performance and quality of the ceramic powders made from the precursor mixture is partly dependent upon the homogeneity of the composition in the ceramic particle. In other words, the better the mixing of the components in the ceramic precursor mixture, the better the homogeneity of the droplets, dried particles and the final product. Primarily for this reason, it is preferred that the ceramic precursor mixture be a uniformly dispersed mixture at the molecular or ionic level, i.e., a true solution. Although ceramic powders can be formed from emulsions, microemulsions, sols, suspensions or supersaturated solutions of metal salts, more effort is needed with these mixtures to ensure and maintain a satisfactory degree of compositional homogeneity in the droplets, dried particles, and ceramic powders that are formed. In addition, when comparing the true solutions to the alternative type of mixtures listed above, the final stoichiometry in the formed droplets can be predicted more reliably for the true solutions. For instance, when supersaturated solutions or sols containing more than one metal salt are used, the homogeneity of the components in the droplet is more difficult to predict and achieve due to the different rates and degrees of precipitation or gelation that can cause segregation of the components.

Although certain combinations of metal salts can be found that have similar rates and degrees of precipitation or gelation, there are more combinations of metal salts that form true solutions. Accordingly, when using sols, suspensions or supersaturated solutions as a ceramic precursor mixture from which the droplets are formed, one should attempt to obtain as high a degree of homogeneity of the components as possible. For example, with the supersaturated mixtures, sols, or suspensions, the particles should at the very least be uniformly suspended at the time the droplets are formed.

To achieve a true solution, the overall metal cation concentration in the ceramic precursor mixture should not be so great that precipitation of the metal salts or other species occurs. On the other hand, the overall metal cation concentration should not be so low that the process provides a poor yield. In addition, when the overall metal cation concentration is too low, unnecessary amounts of external energy are required in order to remove the larger amount of solvent present in the droplets.

Based on the desired stoichiometry of the final ceramic product and the particular combination of metal salts used, the appropriate overall metal cation concentration and molar concentration of the individual metal salts in the ceramic precursor mixture can be determined. The phrase "overall metal cation concentration" refers to the sum of the concentration of the individual metal cations in the ceramic precursor mixture. For example, with the 123 superconductor, the overall metal cation concentration is determined by summing the individual molar concentrations of the yttrium cation, barium cation, and copper cation in the precursor mixture.

Briefly, the stoichiometry of the metals in the ceramic product establishes the ratios of the metal salts in the ceramic precursor mixture. The ratios are then used to determine the molar concentration of the various metal salts based on the metal salt that has the limiting solubility. The actual molar concentration of the metal salt of limiting concentration should be chosen so that a satisfactory yield of the ceramic is provided. The higher the concentration of the metal salt of limiting solubility, the higher the yield of ceramic product and the lower the concentration of the metal salt of limiting solubility, the lower the yield of ceramic product. Another way of increasing the absolute yield without increasing the molar concentration of the metal salt of limiting solubility is to increase the volume of the ceramic precursor mixture. For ceramic precursor mixtures that are not true solutions, the overall metal cation concentration can be greater than the concentrations that will form a true solution, so long as a substantially homogenous mixture can be established from which the droplets can be formed.

The amount of carbohydrate present in the ceramic precursor mixture is based on a carbon-oxygen balance for the complete combustion of the carbohydrate and oxidation of the metal cation based on the amount of $O_2$ available from the reduction of the anions of the metal salt. For a metal nitrate, where the metal cation has a valence of +2 and the carbohydrate is sucrose, a ratio of the sucrose to nitrate anion concentrations in the precursor solution can be determined as follows:

1. Reduction of nitrate and oxidation of metal cation
$M(NO_3)_2 \rightarrow MO + N_2 + 5/2O_2$.

2. Oxidation of sucrose $C_{12}H_{22}O_{11} + 12O_2 \rightarrow 12CO_2 + 11H_2O$.

The ratio of the theoretical amount of $O_2$ produced by the reduction of the nitrate and the oxidation of the metal cation (reaction 1.) and the oxygen required for the oxidation of the sucrose (reaction 2.) gives a ratio of the theoretical amount of sucrose that can be oxidized by the nitrate anion based on a mole of metal cation.

$$\frac{5/2 \frac{\text{mole } O_2}{\text{mole metal cation}}}{12 \frac{\text{mole } O_2}{\text{mole sucrose}}} = 0.208 \frac{\text{mole sucrose}}{\text{mole metal cation}}.$$

Since stoichiometrically, for every mole of +2 metal cation, there are 2 moles of nitrate anions, the theoretical amount of sucrose that can be oxidized by the nitrate anions can be expressed as $$0.104 \frac{\text{mole sucrose}}{\text{mole nitrate}}.$$

Theoretically, this amount of carbohydrate would lead to an efficient and complete combustion of the carbohydrate in conjunction with the generation of enough thermal energy to complete the conversion of the metal salts to their oxides. If too little carbohydrate is used, the conversion of the metal salts to a single phase ceramic is not complete. This incomplete conversion can be determined from an x-ray diffraction pattern of the powder. It has been found that if an excessive amount of carbohydrate is used, the conversion of the metal salts to a single phase ceramic will not proceed to completion. In the context of the present invention, an acceptable amount of carbohydrate can range from about 90% of the value as determined above, up to about 5 times the value calculated above. It should be understood that the calculation set forth above is exemplary based on metal nitrates and sucrose as the components of the ceramic precursor mixture. Other combinations of metal salts and carbohydrates will give different ratios for the amount of carbohydrate relative to the amount of anion present.

Since the carbohydrates useful in the context of the present invention do not form complexes with the metal ions in the ceramic precursor mixture, the drying step and conversion of the metal salts to ceramics can be carried out efficiently, completely and cleanly without the production of intermediate compositions or reaction products that adhere to the equipment in which the drying and conversion is accomplished. This is in contrast to other organic fuels such as glycine or urea which complex with the metal ions in solution. As set forth in Comparative Examples 1 and 2, drying of droplets formed from solutions containing metal nitrates and glycine or urea produce particles with a honey-like consistency that deposit on the equipment used for the drying. In addition, the droplets tend to form unwanted agglomerates. The depositing of the honey-like mixture and viscous foam on the process equipment is especially undesirable in a continuous process compared to a batch process because in a continuous process one does not have as many opportunities to clean the equipment. More importantly, the agglomeration or buildup of the partially dried glycine or urea/metal salt droplets on the process equipment produces the potential for a dangerous explosive reaction should the urea or glycine combust uncontrollably.

A ceramic precursor mixture formed in accordance with the present invention can be converted into a single phase ceramic by forming droplets of the ceramic precursor mixture followed by pyrolyzing the dried particles to convert the metal salts to their metal oxide counterparts and form a single phase ceramic. The droplets can be formed by any of a number of techniques known in the art, such as atomization or formation of an aerosol. Typically, larger droplets are formed by atomization compared to the droplets formed by an aerosol generator. The formed droplets can be dried by contacting them with a hot gas, such as air. Alternatively, if a slower rate of drying is desired, the droplets can be dried at ambient temperature by using a carrier gas to pass the droplets through a desiccating zone of substantially zero relative humidity. Although this alternative drying technique may require longer residence times compared to drying droplets by contacting them with a hot gas, for smaller droplets, e.g., smaller than about 20.0 microns, the longer residence times may not be that great. In addition, the increased residence times may be beneficial when it comes to avoiding the formation of hollow spheres as described in Example 3. For droplets larger than 20.0 microns, this alternative drying technique can still be used so long as the residence time is compatible with the balance of the process.

The drying step preferably fully dehydrates the droplets down to a critical state of dehydration. The critical state of dehydration is defined as the state of the droplet after substantially all the solvent has been removed. Thermodynamically, when a hot gas is used to dry the droplets, the critical state is reached when the thermal energy of the drying zone begins to heat the metal salts and carbohydrate in the dried droplet. Achievement of the critical state of dehydration can be determined by removing samples of the particles and using an analytical technique such as gas chromatography/mass spectrometry to detect the presence of solvent. Empirically, the achievement of the critical state of dehydration is evidenced by periodic flashing or sparking of the smaller particles in the drying zone. The sparking is evidence of the initiation and completion of the anionic oxidation-reduction reaction between the anion of the metal salt and the carbohydrate. The smaller particles tend to spark first because of the more efficient heat transfer into the particles and the fact that the solvent will be completely removed from these particles first. If a substantial amount of sparking or flashing of particles begins to take place in the drying zone, the degree of drying in the drying zone can be reduced to avoid an explosive reaction in the dryer. After the droplets are dried, they are separated from the drying gas using conventional equipment such as a cyclone separator. If the alternative drying technique described above is used, the carrier gas can be removed from the product particles after the pyrolysis step described below. The separated drying gas or carrier gas can be exhausted to a gas scrubber if the solvent is toxic.

When the alternative drying technique employing the ambient temperature desiccating zone is used, achievement of the critical state can be predicted theoretically relying upon principles of thermodynamics and transport phenomena. Alternatively, the critical state of dehydration can be determined by using a gas chromatograph/mass spectrometer as mentioned above. Empirically, the achievement of the critical state of dehydration when the desiccating zone is used can be determined by the lack of condensation of solvent on cold surfaces after the anionic oxidation-reduction reaction is complete and the particles and carrier gas are cooled.

After the droplets are dried to the critical state, they are subjected to a temperature high enough to initiate the anionic oxidation-reduction reaction between the anions of the metal salt and the carbohydrate. For the preferred saccharides and the metal nitrates, this temperature should be greater than about 300° C. The thermal energy generated by the exothermic reaction and to a lesser degree, the external thermal energy provided by the reaction initiating temperature of the furnace is sufficient to convert the metal salt to a single phase ceramic comprising a metal oxide. If the conversion of the metal salts to a single phase ceramic is not complete, intermediates such as metal carbonates and metal hydroxides can be converted to metal oxides and a single phase ceramic formed by a subsequent calcination step. Nonetheless, even when the subsequent calcination step is necessary, there is a reduction in the overall amount of external thermal energy required to convert the metal salts to a single phase ceramic. By utilizing the thermal energy of the anionic oxidation-reduction reaction between the anion of the metal salt and the carbohydrate, the temperature of the hot zone or furnace typically used to convert the metal salts to their metal oxides and form a single phase ceramic can be reduced, thus lowering the external energy needs of the process.

The energy produced by the exothermic anionic oxidation-reduction reaction is released very quickly, as evidenced by the flashing or sparking of the dried particles in the furnace. It has been found that the speed with which the metal salts are converted to their metal oxides and a single phase formed affects the homogeneity or scale of mixing in the particles after the anionic oxidation-reduction reaction is completed. Converting the metal salts to their oxides and forming a single phase quickly, reduces the potential for segregation of individual phases within the particles before a single phase is achieved because the period of time the phases exist and have to segregate is short. Even when the thermal energy of the exothermic anionic oxidation-reduction reaction and the furnace are not able to completely convert the metal salts to a single phase ceramic, the quickness of the conversion of the metal salt particles to a multiphase ceramic provides a scale mixing of the components in the reacted multiphase particles, such that only one thermal cycle is required to complete the conversion of the particles to a single phase ceramic. In contrast, particles of multiphase ceramics with a less than satisfactory scale of mixing would require several thermal cycles to achieve a single phase ceramic.

The size of the dried particles that enter the furnace where the anionic oxidation-reduction reaction is initiated preferably have a surface area to volume ratio such that the amount of thermal energy generated within the dried particle is much larger than the amount of thermal energy lost from the particle during the reaction. The amount of thermal energy retained within the particle is preferably sufficient to convert the metal salt to a single phase ceramic. Since the amount of thermal energy generated is related to the amount of reactants participating, and the amount of reactants depends on the volume of the particle, larger particles would produce more thermal energy compared to smaller particles. However, the loss of thermal energy or total thermal energy flux is a function of the surface area of the particle. Generally, the larger the surface area, the larger the overall heat flux from the particle. Therefore, the combination of the surface area of the particles and the volume of the particles is preferably such that a maximum amount of heat or thermal energy generated by the oxidation-reduction reaction is retained by the individual particles. An acceptable surface area to volume ratio of the particles can be evaluated by observing the degree of conversion of the metal salts in the particle to a single phase ceramic. If the conversion of the metal salt to a single phase ceramic is not complete, the ratio of surface area to volume should be decreased in order to decrease and minimize the heat flux out of the particle and increase the amount of heat retained by the dried particle. The ratio of surface area to volume of the particles can be varied by changing the particle size. By retaining more heat, more thermal energy will be available and the conversion of the metal salt to a single phase ceramic will be more complete. In addition to retaining more heat, smaller particles with larger surface area to volume ratios also reduce the distance the components in the particle can segregate as they are converted to a single phase ceramic.

Additionally, to promote complete conversion of the metal salts to a single phase ceramic, the residence time of the particle in the furnace or the temperature of the furnace can also be increased; however, to minimize the external energy requirements, any increase in residence time or furnace temperatures should be limited to the amount required to complete the conversion of the metal salt to a single phase ceramic. However, the temperature of the furnace should not be below the temperature required to initiate the anionic oxidation reduction reaction between the anion of the metal salt and the carbohydrate. It should be understood that increasing the temperature of the furnace would serve to decrease the heat loss out of the particles compared to the heat loss out of particles in a furnace at a lower temperature because of the smaller driving force for heat loss, i.e., the smaller temperature difference between the interior of the particle and the ambient temperature of the furnace. Accordingly, the temperature of the furnace is another factor that can be varied to help achieve complete conversion of the particles of metal salt to a single phase ceramic.

The production of superconductive ceramics from the appropriate metal salts typically requires more thermal energy than required to produce nonsuperconductive ceramics. The increased energy requirements are generally needed because a single phase superconductive ceramic, for example a perovskite structure for 123 superconductor, is more complex than the typical structure of a single phase nonsuperconductive ceramic. Accordingly, in order to completely convert the metal salts in the dried particles to a superconductive ceramic utilizing the thermal energy provided by the exothermic anionic oxidation-reduction reaction and the furnace minimization of the heat flux out of the dried particles very important.

The Examples set forth below illustrate the utilization of the thermal energy of the exothermic anionic oxidation-reduction reaction described above in the production of superconducting and nonsuperconducting single phase ceramic powders. The Examples also illustrate the cleanliness of the process and the feasibility of operating it on a continuos basis. The following examples are intended only as illustrations of carrying out the present invention. The comparative examples are not illustrations of the present invention.

EXAMPLE 1

In accordance with the present invention, nonsuperconductive powders can be produced by a process that takes advantage of the thermal energy produced by the exothermic anionic oxidation-reduction reaction between the anions of the metal salts and the carbohydrate. In this example, the furnace temperature and the thermal energy produced by the reaction convert the metal salts to a single phase ceramic.

202.01 grams (0.50 mole iron) of $Fe(NO_3)_2.9H_2O$, 34.73 grams (0.121 mole manganese) of $Mn(NO_3)_2.6H_2O$ and 31.23 grams (0.105 mole zinc) of $Zn(NO_3)_2.6H_2O$ were added to 1.7 liters of deionized water. 51.64 grams of AR grade sucrose was added to the metal salt solution.

Figure 1:
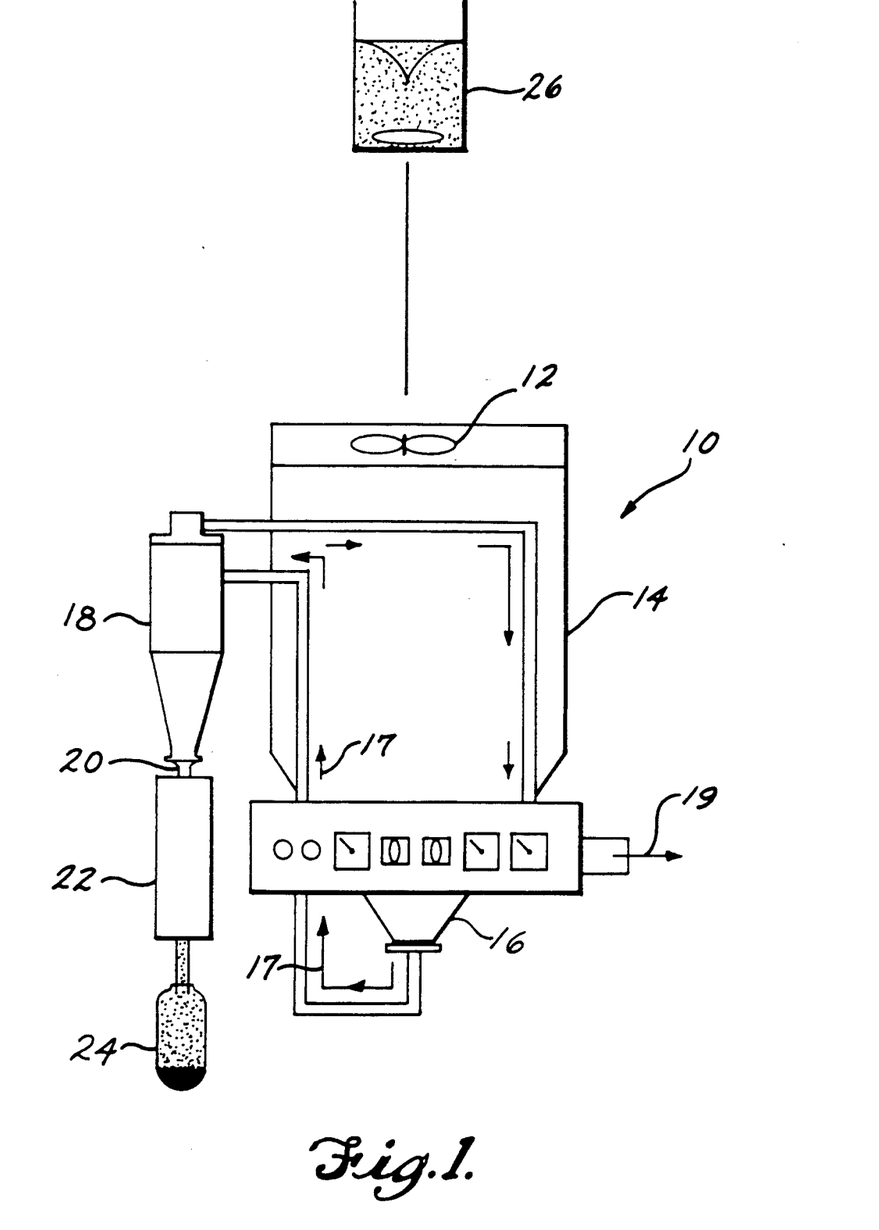
FIG. 1 is a schematic view of a representative apparatus used to carry out a process in accordance with the present invention.

Referring to FIG. 1, a NIRO ATOMIZER portable spray-dryer, generally indicated by reference numeral 10, was used to spray-dry the ceramic precursor solution described above. The NIRO ATOMIZER portable spray-dryer is available from NIRO ATOMIZER of Columbia, Md. The spray-dryer 10 includes a centrifugal atomizer 12 capable of speeds up to 40,000 rpm. The atomizer sits near the top of a drying chamber 14 that has an inner diameter of 2 feet, 7 inches, with a 2-foot cylindrical height and a 60° conical bottom 16. The centrifugal atomizer and drying chamber are made from stainless steel. The drying chamber is coupled to an electric air heater (not shown) for providing drying air to the drying chamber. The drying air is drawn through the drying chamber in the direction of arrows 17 by a blower (not shown) positioned downstream from the drying chamber. The spray-dryer 10 includes a cyclone separator 18 that receives the drying air and dry product from the bottom of the drying chamber. The cyclone separator separates the dry product from the exhausted drying air 19. The bottom of the cyclone separator includes an outlet 20 that allows the dried particles to gravitate into a vertically oriented tube furnace 22 capable of maintaining an air temperature of about 300°–450° C. The dried particles are pyrolyzed in the tube furnace. The tube furnace has a height sufficient to provide a residence time for the freely gravitating particles of about 0.5 to 2.0 seconds. The bottom of the tube furnace communicates with a collection chamber 24 where the ceramic particles are collected.

Figure 2:
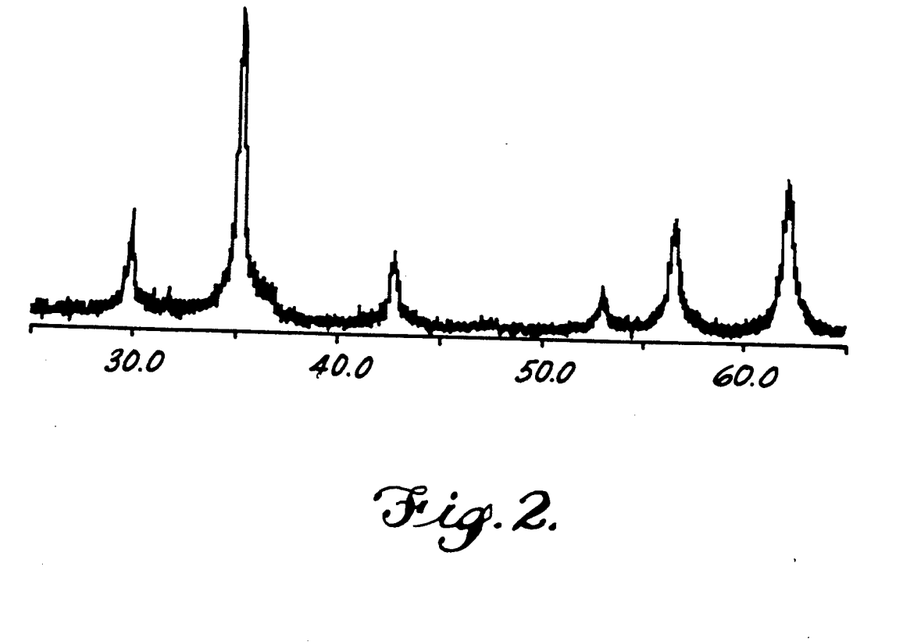
FIG. 2 is an X-ray diffraction pattern of nonsuperconductive powder produced in accordance with the present invention using the apparatus of FIG. 1.
Figure 3:
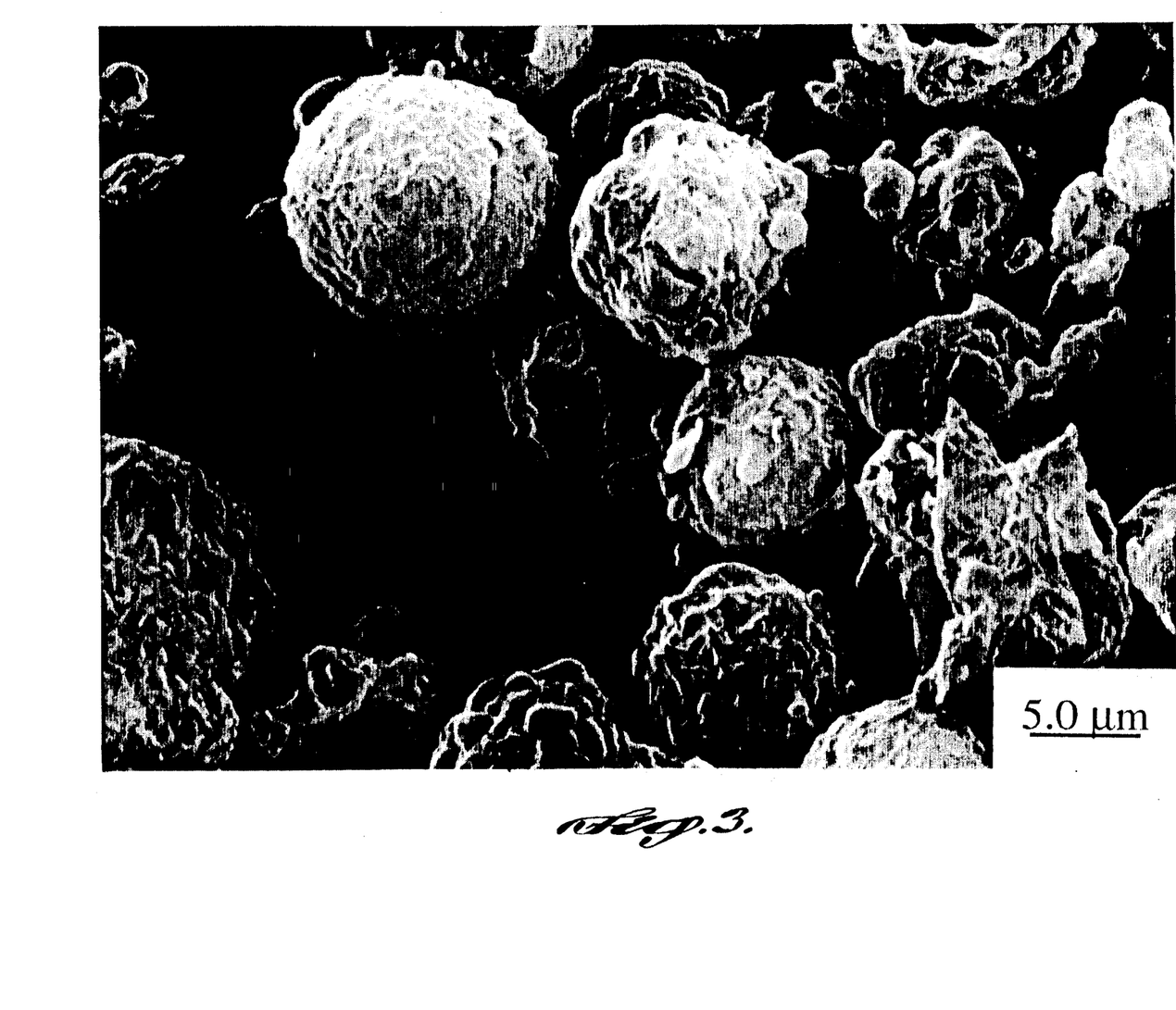
FIG. 3 is a photomicrograph of nonsuperconductive ceramic powder produced in accordance with the present invention using the apparatus of FIG. 1.

The ceramic precursor solution 26 described above was introduced into the spray-dryer chamber at a flow rate of about 1.8 liters per hour. The centrifugal atomizer spinning at about 30,000 RPMs broke up the precursor solution into small droplets having a diameter on the order of about 20–50 microns. The air flow through the drying chamber and cyclone ranged between about 35–40 standard cubic feet per minute. The air entering the drying chamber was preheated to about 375° C. As the small droplets were forcefully convected toward the bottom of the drying chamber, they became fully dehydrated down to a critical state of dehydration such that their diameter was reduced to about 10.0 microns or less. Some of the smaller particles were observed to flash or spark in the drying chamber indicating the critical state for these particles was achieved. The temperature of the drying gas at the bottom of the drying chamber was approximately 125° C. which ensures substantially all the water was removed from the particles in the spray-dryer. The dried powder and drying air were then separated from each other in the cyclone separator. The separated powder fell due to gravity through the tube furnace, which was preheated to about 490° C. The particles' residence time in the furnace ranged from about 0.5–2.0 seconds. The temperature in the tube furnace initiated the exothermic anionic oxidation-reduction reaction between the nitrate ions and the sucrose in the individual particles. The exothermic reaction was evidenced by sparking or flashing of the particles as they fell through the furnace into the glass collection jar. When most of the particles reach the critical state in the drying chamber, the flashing or sparking begins near the top of the tube furnace. The combustion by-products ($CO_2$ and water vapor) were passed through the system and out the exhaust, while the reacted particles dropped into the collection jar. About 60.0 grams of particles were collected, having an average particle size of approximately 5.0 microns. The original dried particles were converted to even smaller interconnected primary particles having submicron size as evidenced by surface areas on the order of 30–40 $m^2/gram$ for the collected particles. The collected particles were friable and could be easily broken down into the smaller primary particles. It was determined that the dried particles had been converted to a single phase ceramic by comparing an X-ray diffraction pattern (FIG. 2) for the collected powder with reference patterns established by the Joint Committee on Powder Diffraction Standards (JCPDS) and referenced by microfiche Nos. 19-1461 and 28-1468 in *POWDER DIFFRACTION FILE IN ORGANIC PHASES ALPHABETICAL INDEX CHEMICAL AND MINERAL NAME*, 1986 by JCPDS. FIG. 3 is a photomicrograph of the collected particles.

EXAMPLE 2

Superconductive ceramic powders can also be produced from ceramic precursor mixtures and the process of the present invention. The following example illustrates the preparation of a superconductive ceramic. In this example, the thermal energy of the furnace and the thermal energy of the exothermic anionic oxidation-reduction reaction between the anions of the metal salts and the carbohydrate convert the metal salts to a multiphase ceramic. Multiphase ceramics are useful when superconducting articles are to be made from the ceramic powders by first forming articles from the multiphase ceramic and then calcining or sintering the article to convert the multiphase ceramic to a single phase superconductive ceramic. A process where the thermal energy of the anionic oxidation-reduction reaction and the thermal energy of the furnace are sufficient to completely convert the metal salts to a single phase superconductive ceramic is described in Example 3.

78.51 grams (0.21 mole yttrium) of $Y(NO_3)_3.5.5H_2O$ 109.77 grams (0.42 mole barium) of $Ba(NO_3)_2$, and 148.1 grams (0.63 mole copper) of $Cu(NO_3)_2.2.64H_2O$ were added to 3.0 liters of deionized water. 97.1 grams of sucrose (AR grade) was added and dissolved into the aqueous metal salt solution.

Figure 4:
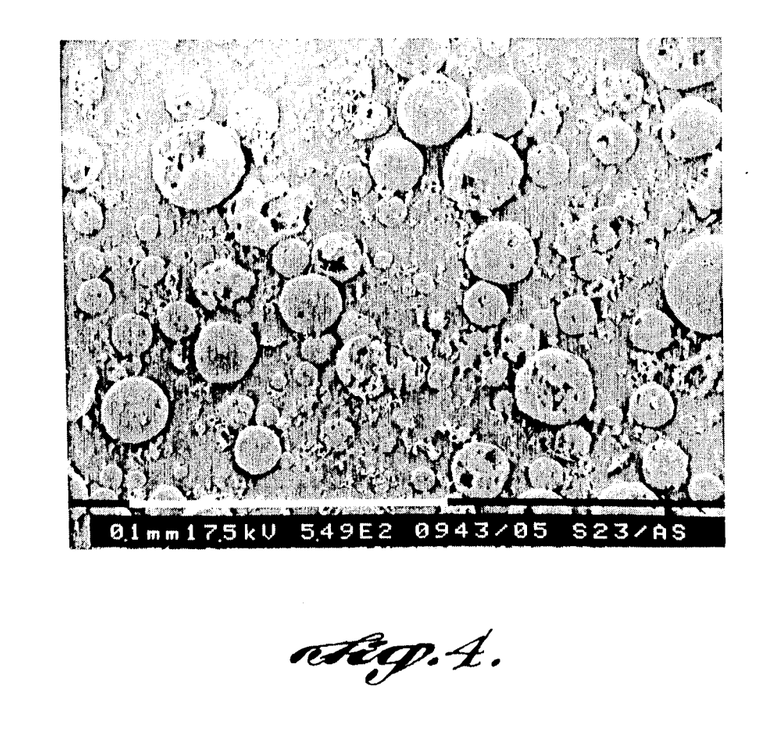
FIG. 4 is a photomicrograph of a multiphase ceramic powder produced in accordance with the present invention using the apparatus of FIG. 1.

The ceramic precursor solution was introduced into the spray-dryer chamber at a flow rate of about 3.5 liters per hour. The centrifugal atomizer spinning at about 30,000 RPMs broke up the precursor solution into small droplets having a diameter on the order of about 20–50 microns. The airflow through the drying chamber and cyclone ranged between about 35–40 standard cubic feet per minute. The air entering the drying chamber was preheated to about 425° C. As the small droplets were forcefully convected toward the bottom of the drying chamber, they became fully dehydrated down to a critical state of dehydration such that their diameter was reduced to about 10.0 microns or less. The temperature of the drying gas at the bottom of the drying chamber was approximately 125° C. The dried powder and drying air were then separated from each other in the cyclone separator. The separated powder fell due to gravity through the tube furnace, which was preheated to about 350° C. The particles' residence time in the furnace ranged from about 0.5–2.0 seconds. The temperature in the tube furnace initiated the exothermic anionic oxidation-reduction reaction between the nitrate anions and the sucrose in the individual particles. The exothermic reaction was evidenced by sparking or flashing of the particles as they fell through the furnace and into the glass collection jar. The combustion by-products ($CO_2$ and water vapor) were passed through the system and out the exhaust. 140.0 grams of particles were collected. FIG. 4 is a photomicrograph of the collected particles.

Figure 5:
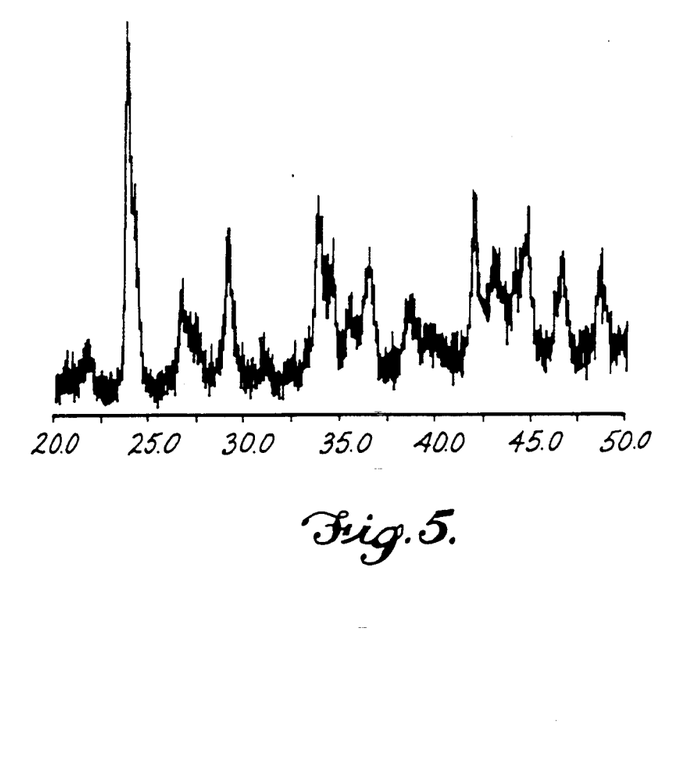
FIG. 5 is an X-ray diffraction pattern of the multiphase ceramic powder of FIG. 4.

An x-ray diffraction pattern of the collected particles (FIG. 5) compared to the x-ray diffraction patterns for barium carbonate, yttrium oxide, and copper oxide indexed as microfiche Nos. 5-378, 25-1200 and 5-661 in the JCPDS index cited in Example 1, leads to the conclusion that the particles were a multiphase ceramic of $BaCO_3$, $Y_2O_3$ and $CuO$. In order to convert the multiphase ceramic to a single phase superconductive ceramic, the powder was heat-treated. Because of the high scale of mixing (i.e., homogeneity) of the phases in the multiphase ceramic, only one thermal cycle as described below was required. The thermal cycle involved heating the particles at room temperature at a rate of 10° C. per minute up to 700° C., heating from 700° C. to 950° C. at a rate of 1.0° C. per minute, holding at 950° C. for 6 hours and cooling to room temperature at 1.0° C. per minute. The thermal cycle was conducted in an environment of ambient air. The heat-treated particles did not coalesce and were flowable, further supporting the conclusion that the multiphase ceramic exhibited a highly homogenous mixture of phases.

Figure 6:
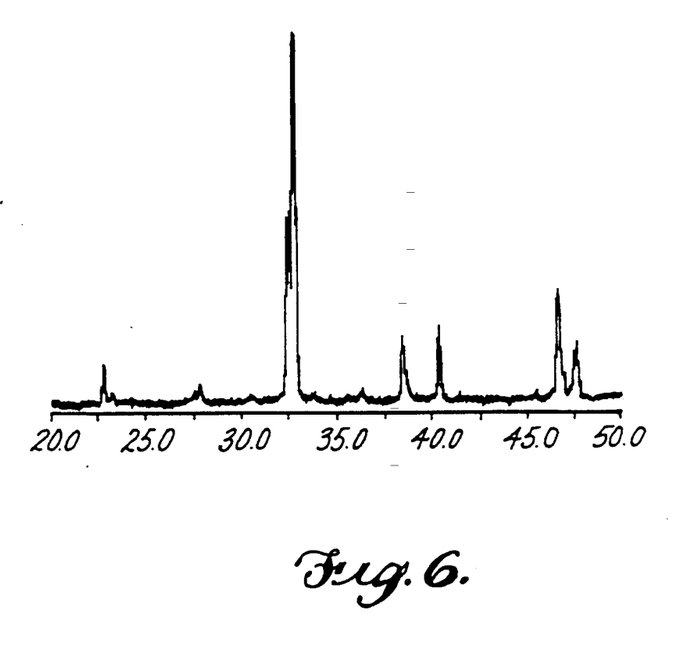
FIG. 6 is an X-ray diffraction pattern of the particles of FIG. 4 after being heat-treated.

Comparing an X-ray diffraction pattern of the heat-treated particles (FIG. 6) with x-ray diffraction patterns for $Y_1Ba_2Cu_3O_7$ generated by the National Institute of Science and Technology and published in Advanced Ceramic Materials, Volume 2, No. 3B, July 1987, pp. 571–575 leads to the conclusion that the multiphase ceramic was converted to a single phase ceramic that exhibits superconductivity. The superconductive property of the ceramic was confirmed directly by AC susceptibility testing.

Although the particles out of the tube furnace in this Example required an additional heat treatment, the overall external energy required to convert the metal salts to their superconducting phase was less because of the utilization of the thermal energy generated by the anionic oxidation-reduction reaction between the anions of the metal salts and the sucrose.

EXAMPLE 3

A process carried out in accordance with the present invention takes advantage of the thermal energy generated by an anionic oxidation-reduction reaction between the anions, preferably the anions of metal salts and a carbohydrate in the ceramic precursor mixture. As illustrated by Examples 1 and 2, the thermal energy generated by the exothermic anionic oxidation-reduction reaction is sufficient to reduce the overall magnitude of thermal energy that must be supplied by external heat sources. In Example 1, dried particles of metal salts and a carbohydrate were completely converted to a single phase nonsuperconductive ceramic by the thermal energy of the reaction initiated in a furnace at about 490° C. In Example 2, the thermal energy of the reaction was sufficient to convert the dried particles of metal salt and carbohydrate to a homogenously mixed multiphase ceramic that required one additional thermal cycle to convert the multiphase ceramic to a single phase superconductive ceramic. The following Example illustrates how the thermal energy of the oxidation-reduction reaction can be harnessed to completely convert the dried particles of metal salts exhibiting homogeneous mixing of cations to a single phase superconductive ceramic.

A ceramic precursor mixture for a $YBa_2Cu_3O_7$ superconductor (i.e., a 123 superconductor) is prepared as described in Example 2. The amounts of the individual metal nitrates can be varied so long as the stoichiometry for the 123 superconductor is maintained, and so long as the barium nitrate serves as the controlling component due to its limiting solubility parameter.

A stoichiometric amount of sucrose, determined as described in the Detailed Description, is added to the solution. The stoichiometric amount maximizes the thermal energy release during the anionic oxidation-reduction reaction between the nitrate anions and the sucrose.

Since the temperature in and around the dried particles when the oxidation-reduction reaction takes place is primarily dependent upon the thermal energy generated by the anionic oxidation-reduction reaction, in order to achieve complete conversion of the metal salts to a single phase superconductive ceramic, optimum retention of this thermal energy within the particle is preferred. This is achieved by maximizing the amount of thermal energy generated by the reaction while minimizing the amount of thermal energy that is lost from the particle to the ambient furnace environment during the reaction. Since the amount of thermal energy generated by the oxidation-reduction reaction is a function of the amount of reactants in the particle, and the amount of reactants is a function of the volume of the particle, in order to increase the amount of thermal energy generated by the reaction the volume of the particle should be increased. However, the loss of thermal energy from the particle, (i.e., total thermal energy flux) generally increases as the surface area of the particle increases. Therefore, there is a critical combination of the surface area of the particle and the volume of the particle whereby the thermal energy generated by the reaction less the thermal energy lost by the particle during the reaction is sufficient to completely convert the metal cations to a single phase superconducting ceramic. Optimization of the surface area-to-volume ratio for dried particles of various metal contents can be readily determined by observing the degree of production of single phase superconductive ceramic as the concentration of metal salts, carbohydrate content, and/or furnace temperature are routinely varied pursuant to the disclosure Complete conversion of the metal salts to a single phase superconductive ceramic can be readily monitored, e.g., by comparing an x-ray diffraction pattern of the particles with a JCPDS x-ray diffraction pattern for a single phase 123 ceramic. The superconductivity o the particles can be readily monitored, e.g., by AC susceptibility testing. Since the surface area of the particles is a function of the square of the radius and the volume is a function of the cube of the radius for substantially spherical particles, the ratio of the surface area to volume for the dried particles is varied by varying the size of the droplets. Generally, for substantially spherical particles, smaller particles have larger surface area to volume ratios compared to larger particles.

The size of the dried particles is controlled primarily by the method used to generate the droplets that are dried to form the particles. One skilled in the art of droplet formation and size classification will be able, using available apparatuses, to produce droplets and classify them to provide particles having a size that provides a predetermined ratio of surface area to volume as determined in the previous paragraphs. Once the droplets are formed and, if necessary, classified, they are dried to produce the dried particles described above.

The droplets are preferably dried slowly so that solid spheres are produced. Drying the droplets at an excessively high rate leads to formation of a rigid skin of precipitated salt as the first portion of the solvent is removed. This subsequently inhibits further shrinkage of the droplets as the drying proceeds to completion. When the droplets are dried at an excessively high rate, they form hollow particles, that can be detected by observing the particles with a Scanning Electron Microscope (SEM). Particles dried at a satisfactory rate are in the form of dense substantially spherical particles as observed with an SEM. After the particles are dried, they are passed through a furnace operated at a temperature sufficiently high to initiate the anionic oxidation-reduction reaction between the anions of the metal salts and the carbohydrate, yet below the temperature that would be required to convert the metal salts to a single phase superconductive ceramic phase in the absence of the exothermic anionic oxidation-reduction reaction. A sufficiently high furnace temperature is evidenced by sparking or flashing of the particles as the anionic oxidation-reduction reaction is initiated and completed.

Particles collected from the furnace are evaluated by x-ray diffraction as described above to determine whether a single phase superconductive ceramic is produced. If a single phase superconductive ceramic is not produced, the particle size is varied and the x-ray diffraction analysis repeated until a single phase superconductive ceramic is produced. In this manner, the critical ratio of surface area to volume is identified for the metal cation or cations of interest, from which the range of operable ratios for the particles of interest can be readily established. The production of single phase superconductive ceramic particles by this process can be further optimized by varying the other reaction parameters such as metal salt concentration, furnace temperature, residence time in the dryer, residence time in the furnace, and concentration of carbohydrate, to determine the operable and preferred ranges of these parameters within the context of the subject exothermic anionic oxidation-reduction reaction between the anions of the metal salt and the carbohydrate in the starting material.

COMPARATIVE EXAMPLE 1

The following example is not an illustration of the present invention.

Employing the apparatus described in Example 1 above, 26.50 grams (0.07 mole yttrium) of $Y(NO_3)_3.5.75H_2O$, 36.59 grams (0.14 mole barium) of $Ba(NO_3)_2$, and 48.84 grams (0.21 mole copper) of $Cu(NO_3)_2.2.5H_2O$ were added to one liter of deionized water. 45.53 grams of urea was dissolved in 0.2 liter of deionized water and added to the metal salt solution.

This solution was introduced into the spray-dryer chamber at a flow rate of about 1.0 liters per hour. The centrifugal atomizer spinning at about 30,000 RPMs broke up the precursor solution into small droplets having a diameter on the order of about 20–50 microns. The air flow through the drying chamber and cyclone ranged between about 35–40 standard cubic feet per minute. The air entering the drying chamber was preheated to about 410° C. As the small droplets were forcefully convected toward the bottom of the drying chamber, they became partially dehydrated. The partially dehydrated particles had a honey-like consistency. The particles stuck together and formed agglomerates that stuck to the surfaces of the drying chamber and could not be passed into the furnace.

COMPARATIVE EXAMPLE 2

The following is a comparative example and it is not intended to illustrate the present invention.

Using the spray-dryer described in Example 1, a metal salt solution including glycine is formed. The solution includes the same metal salt concentrations as those described in Example 2. 136.6 grams of glycine is added to the solution. The glycine causes the solution to turn dark blue. The solution is introduced into the spray-dryer chamber at a flow rate of about 1.0 liters per hour. The centrifugal atomizer spinning at about 30,000 RPMs breaks up the precursor solution into small droplets having a diameter on the order of about 20–50 microns. The air flow through the drying chamber and cyclone ranges between about 35–40 standard cubic feet per minute. The air entering the drying chamber is preheated to about 410° C. The small droplets are forcefully convected toward the bottom of the drying chamber. The droplets were partially dehydrated. The partially dehydrated particles were highly viscous, like honey. The particles tended to clump together and stuck on the surfaces of the drying chamber and could not be passed into the furnace.

In an effort to promote the ignition of the glycine, 96 grams of sucrose is added to the solution with the 136.63 grams of glycine. The same results as described in the previous paragraph were observed.

It should be understood that, while preferred embodiments of the present invention have been illustrated and described in the above examples and detailed description, various changes can be made therein without departing from the spirit and scope of the invention.

The embodiments of the invention for which an exclusive property or privilege is claimed are defined as follows:

1. A process for producing particles of ceramic material, the process comprising the steps:
   (a) forming droplets of a ceramic precursor mixture containing a metal cation, a carbohydrate, a solvent, and an anion capable of participating in an anionic oxidation-reduction reaction with the carbohydrate;
   (b) removing substantially all of the solvent from the droplets of the ceramic precursor mixture to form particles comprising the metal cation, the anion, and the carbohydrate and;

(c) thermally initiating an anionic oxidation-reduction reaction between the anion and the carbohydrate under conditions which permit the anion and the carbohydrate to react in an explosive manner.

2. The process of claim 1, wherein the droplets are formed by atomizing the ceramic precursor mixture.

3. The process of claim 1, wherein the droplets are formed by aerosolizing the ceramic precursor mixture.

4. The process of claim 1, wherein the anionic oxidation-reduction reaction generates thermal energy that promotes conversion of the particles to a multiphase ceramic material consisting essentially of carbonates, hydroxides, and oxides of the metal cation.

5. The process of claim 4, further comprising the step:
(d) heating the particles to convert the multiphase ceramic material into a single phase ceramic.

6. The process of claim 5, wherein the single phase ceramic is a high temperature ceramic superconductor.

7. The process of claim 1, wherein the anionic oxidation-reduction reaction generates thermal energy that promotes conversion of particles to a single phase ceramic consisting essentially of an oxide of the metal cation.

8. The process of claim 7, wherein the thermal energy generated by the anionic oxidation-reduction reaction converts substantially all the particles to a single phase ceramic consisting essentially of oxides of the metal cation.

9. The process of claim 8, wherein the single phase ceramic is a high temperature ceramic superconductor.

10. The process of claim 8, wherein the particles have a surface area to volume ratio such that the thermal energy generated by the anionic oxidation-reduction reaction is greater than the thermal energy that is lost by the particles during the oxidation-reduction reaction.

11. The process of claim 1, wherein step (a) further comprises dispersing the droplets into a gas, and wherein step (b) further comprises separating the gas from the particles.

12. The process of claim 1, wherein the ceramic precursor mixture is a true solution.

13. The process of claim 1, wherein the ceramic precursor mixture is selected from the group consisting of emulsions, microemulsions, sols, supersaturated solutions, and suspensions.

14. A ceramic precursor mixture capable of being converted into a ceramic by thermal energy, the mixture comprising:

(a) a metal nitrate capable of being converted to a metal oxide by thermal energy; and (b) sucrose, the nitrate ion of the metal nitrate and the sucrose participating in an anionic oxidation-reduction reaction, the ceramic precursor mixture having a sucrose to nitrate ion molar ratio ranging from about 0.1 to about 0.5.

15. The ceramic precursor mixture of claim 14, further comprising a solvent selected from the group of solvents consisting of water and short-chain alcohols.

16. The ceramic precursor mixture of claim 15, wherein the mixture is capable of being converted into droplets.

17. The ceramic precursor mixture of claim 14, wherein the metal ion of the metal nitrate is selected from the group consisting of aluminum, barium, bismuth, calcium, copper, chromium, europium, iron, gadolinium, holmium, lanthanum, manganese, lead, strontium, ytterbium, yttrium, and zinc.

18. The ceramic precursor mixture of claim 14, wherein the mixture is a true solution.

19. The ceramic precursor mixture of claim 14, wherein the mixture is selected from the group consisting of emulsions, microemulsions, supersaturated solutions, sols, and suspensions.

20. The process of claim 1, wherein the anion is selected from the group consisting of nitrate, formate, and peroxide anions and the metal cation is selected from the group of metal cations consisting from aluminium, barium, bismuth, calcium, copper, chromium, europium, iron, gadolinium, holmium, lanthanum, manganese, lead, strontium, ytterbium, yttrium, and zinc.

21. A process for producing particles of ceramic material, the process comprising the steps:
(a) forming droplets of a ceramic precursor mixture containing a metal cation, a carbohydrate, a solvent, and an anion capable of participating in an anionic oxidation-reduction reaction with the carbohydrate;

(b) removing substantially all of the solvent from the droplets of the ceramic precursor mixture to form particles comprising the metal cation, the anion and the carbohydrate;

(c) thermally initiating an anionic oxidation-reduction reaction between the anion and the carbohydrate and (d) converting the metal salt to ceramic material, the thermal initiating step and converting step being substantially completed in about 2.0 seconds or less.

* * * * *

UNITED STATES PATENT AND TRADEMARK OFFICE
CERTIFICATE OF CORRECTION

PATENT NO. : 5,061,682       Page 1 of 3
DATED : October 29, 1991
INVENTOR(S) : Ilhan A. Aksay It is certified that error appears in the above-identified patent and that said Letters Patent is hereby corrected as shown below:

| Column | Line | Error |
|---|---|---|
| 10 | 67 | "continuos" should be --continuous-- |
| 18 (Claim 20, Line 4) | 29 | "aluminium" should be --aluminum-- |
| [56] | "OTHER PUBLICATIONS" 2nd Ref. | Please add --Kodas et al., "Aerosol Flow Reactor Production of Fine $Y_1Ba_2Cu_3O_7$ Powder: Fabrication of Superconducting Ceramics," <u>Appl. Phys. Lett.</u>, Vol. 52, No. 19, pp. 1622-1624, May 9, 1988.-- |
| [56] | "OTHER PUBLICATIONS" 3rd Ref. | Please add --Kodas et al., "Single-crystal $YBa_2Cu_3O_7$ Particle Formation by Aerosol Decomposition," <u>J. Appl. Phys.</u>, Vol. 65, No. 5, pp. 2149-2151, March 1, 1989.-- |
| [56] | "OTHER PUBLICATIONS" 4th Ref. | Please add --Moser et al., "A New High Temperature Aerosol Decomposition Process for the Synthesis of Mixed Metal Oxides for Ceramics and Catalysts and Their Characterization," <u>Chem. Eng. Comm.</u>, Vol. 83, pp. 241-259, 1989.-- |
| [56] | "OTHER PUBLICATIONS" 5th Ref. | Please add --Kodas, "Generation of Complex Metal Oxides by Aerosol Processes: Superconducting Ceramic Particles and Films," <u>Advanced Materials</u>, No. 6, pp. 180-192, 1989.-- |

UNITED STATES PATENT AND TRADEMARK OFFICE
CERTIFICATE OF CORRECTION

PATENT NO. : 5,061,682

Page 2 of 3

DATED : October 29, 1991

INVENTOR(S) : Ilhan A. Aksay

It is certified that error appears in the above-identified patent and that said Letters Patent is hereby corrected as shown below:

| [56] | "OTHER PUBLICATIONS" 6th Ref. | Please add --Anderson et al., "Vapor-Phase Processing of Powders: Plasma Synthesis and Aerosol Decomposition," <u>Ceramic Bulletin</u>, Vol. 68, No. 5, pp. 996-1000, 1989.-- |
|---|---|---|
| [56] | "OTHER PUBLICATIONS" 7th Ref. | Please add -- Setaka et al., "Preparation of a Single Crystalline Powder of Superconducting $YBa_2Cu_3O_{7-x}$ by the Gas Phase Solidification Method," <u>Japanese Journal of Applied Physics</u>, Vol. 27, No. 11, pp. L2100-L2102, Nov. 1988.-- |
| [56] | "OTHER PUBLICATIONS" 8th Ref. | Please add --Chick et al., "Synthesis of Air--Sinterable Lanthanum Chromite Powders," Proceedings of First International Symposium on Solid Oxide Fuel Cells, Electrochemical Society, Pennington, New Jersey, Published September 12, 1989.-- |
| [56] | "OTHER PUBLICATIONS" 9th Ref. | Please add --Kingsley et al., "A Novel Combustion Process for the Synthesis of Fine Particle $\alpha$-Alumina and Related Oxide Materials," <u>Materials Letters</u>, Vol. 6, No. 11/12, pp. 427-32, July 1988.-- |
| [56] | "OTHER PUBLICATIONS" 10th Ref. | Please add --Ravindranathan et al., "A Low Temperature Path to the Preparation of Ultrafine Ferrites," <u>Ceramic Bulletin</u>, Vol. 66, No. 4, pp. 688-692, 1987.-- |

UNITED STATES PATENT AND TRADEMARK OFFICE
CERTIFICATE OF CORRECTION

PATENT NO. : 5,061,682
DATED : October 29, 1991
INVENTOR(S) : Ilhan A. Aksay It is certified that error appears in the above-identified patent and that said Letters Patent is hereby corrected as shown below:

[56] "OTHER PUBLICATIONS" 11th Ref.     Please add --Spronson et al., "Ceramic Powder Synthesis by Thermal Reaction of Atomized Solutions," Advances in Ceramics, Vol. 21, Ceramic Powder Science, pp. 99-108, 1987.--

[56] "OTHER PUBLICATIONS" 12th Ref.     Please add --Ulrich, "Chemical Processing of Ceramics," Chemical and Engineering News, pp. 28-40, Jan. 1, 1990.--

[56] "OTHER PUBLICATIONS" 13th Ref.     Please add --Carim et al., "nanocrystalline $YBa_2Cu_3O_{7-\delta}$/Ag Composite Particles Produced by Aerosol Decomposition," Materials Letters, Vol. 8, No. 9, pp. 335-339, September 1989.--

Signed and Sealed this

Sixth Day of April, 1993

*Attest:*

STEPHEN G. KUNIN

*Attesting Officer*     *Acting Commissioner of Patents and Trademarks*